UNITED STATES PATENT OFFICE.

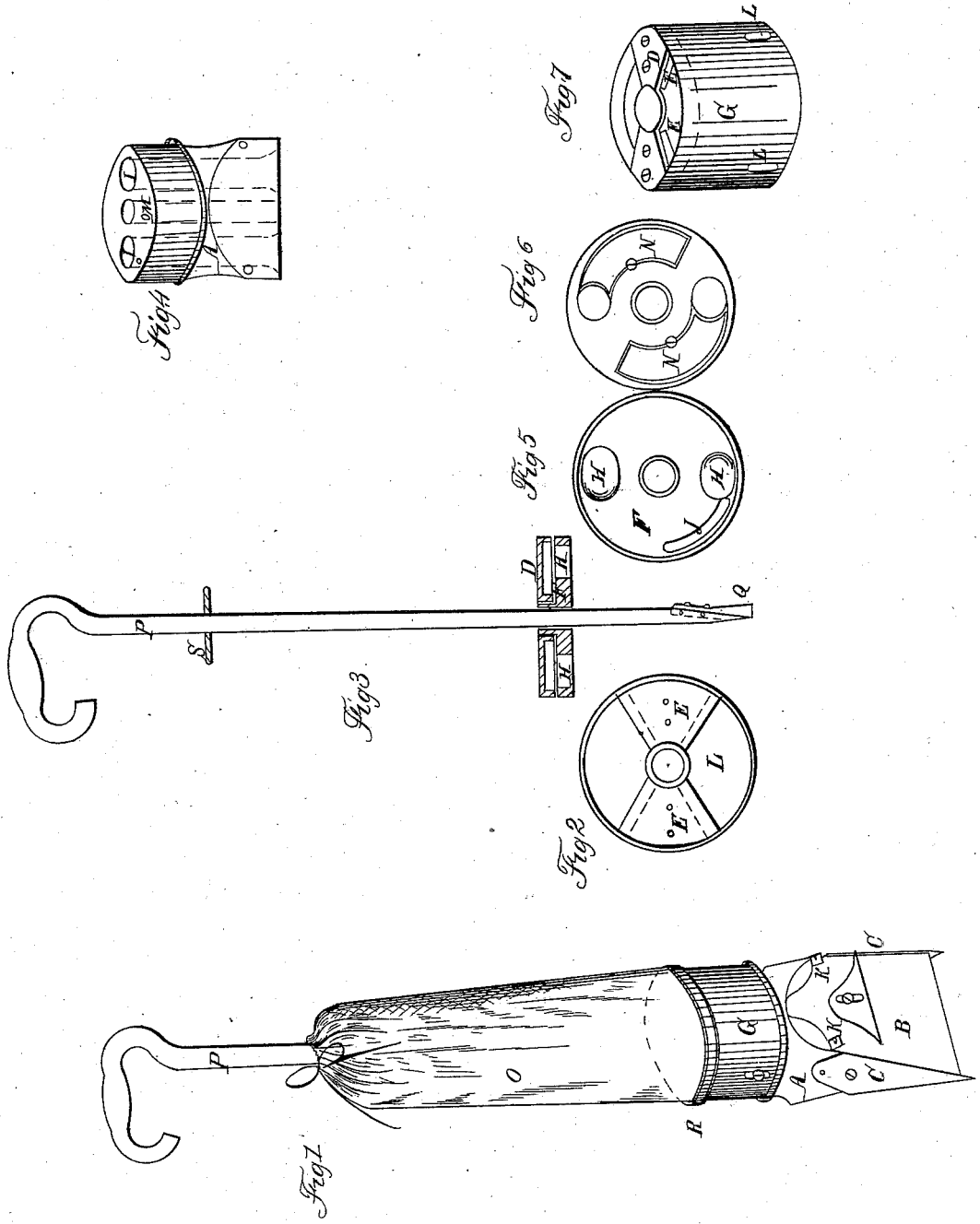

CHARLES KETCHUM, OF PENN YAN, N. Y., ASSIGNOR TO CHAS. G. JUDD.

IMPROVEMENT IN SEED-PLANTERS.

Specification forming part of Letters Patent No. 17,305, dated May 12, 1857.

*To all whom it may concern:*

Be it known that I, CHARLES KETCHUM, of Penn Yan, in the county of Yates and State of New York, have invented a new and useful Improvement in Seed-Planters; and I do hereby declare that the following is a full, clear, and exact description of the same, reference being had to the annexed drawings, making a part of this specification, in which—

Figure 1 is a perspective view of the whole instrument. Fig. 2 represents the under side of the diaphragm. Fig. 3 is a transverse vertical section. Fig. 4 represents a side view of part A; Fig. 5, an under side view of the distributer, and Fig. 6 a bird's-eye view of the distributer; and Fig. 7 is a perspective view of the diaphragm and cylinder to which it is attached.

The same letters refer to similar parts in each figure.

A, Figs. 1 and 4, is a piece to which all the other parts are connected. It has seed-passages I and I and a passage in the center for the handle or staff.

B, Fig. 1, is one of the blades, and has a stop or regulator attached to regulate the depth of depositing the seed. The other blade is similar, but without a stop. These blades are made of sheet metal, in shape as represented. The upper ends above the bolts serve as springs to close the blades. The blades are held in place by the bolts K and K, which pass through each blade and that portion of A which is between the blades. The bolts K and K hold the blades firmly in place, and by them the spring of the blades may be increased or diminished.

C and C are metallic pieces attached to the two edges of the part A, and extending below the blades so far as when thrust into the ground in planting they will prevent the blades from turning with the handle or staff P. They also prevent anything falling from the sides between the blades to obstruct their action.

D is a diaphragm. The under side is represented in Fig. 2, the upper side in Fig. 7. It has a passage in the center for the handle and is open, except the parts which are covered by E and E. These parts are plane on the upper side. On the under side is a rib or flange, at each edge raised higher than the middle. The use of these ribs is to bend the substance that constitutes the parts E and E by means of screws or bolts, as in Fig. 7.

E and E are flexible pieces attached to the under side of the diaphragm. Their use is to strike off the cups H and H as they move round with the handle P.

F is a distributer, (represented in Fig. 5,) and is attached to the handle P. It has seed-cups H and H to measure the quantity of seed. These cups may be varied in size by adjusting the parts N and N. It has a stop-passage, J, which prevents its being turned too far around.

G, Fig. 7, is a cylinder for holding the diaphragm. It may be raised or lowered as distributers of different thicknesses are used. It is fastened to the upper part of the block A by screws passing through the apertures L and L.

M is a pin or stop put in the upper end of the block A to prevent the distributer from being turned too far. This stop may be changed to another place when the part Q is changed.

N and N are adjustable parts of the distributer. Their use is to enlarge or diminish the capacity of the seed-cups H and H.

O is the seed sack or chamber, and is made of cloth or other material. When made of cloth it is kept in form and place on the cylinder by the band R, Fig. 1, and by the circular plate or ring S at the upper end.

Q is an adjustable metallic piece attached to the bottom of the handle P, and its position may be so arranged as to open the blades at the same time or after the seed is dropped into them from the distributer.

To use this instrument, the seed sack or chamber being supplied with seed and the cups H and H adjusted to hold the proper quantity, take hold of the top of the staff or handle with the hand and thrust the blades into the ground to the stop on the blade. Then turn the handle until the seed-cups H and H come over the seed-passages I and I, when the seed will drop between the blades (which are now open) into the ground, and on withdrawing the blades they are closed by their springs, and the other parts are replaced by the same means.

When desirable, the parts Q and M may be so adjusted as that the seed-cups H and H will stand over the seed-passages I and I when the blades are closed, thereby depositing the seed within the blades before they are thrust into the ground or opened, as specified.

I claim—

The blades B, in combination with the bolts K, in the manner and for the purpose set forth.

2. The adjustable cylinder G, in combination with the band R, and sack O, in the manner and for the purpose specified.

CHARLES KETCHUM.

Witnesses:
JOSEPH JONES,
JOHN STEWART.